United States Patent [19]

Geery

[11] 4,238,825
[45] Dec. 9, 1980

[54] EQUIVALENT STANDARD VOLUME CORRECTION SYSTEMS FOR GAS METERS

[75] Inventor: Paul W. Geery, Houston, Tex.

[73] Assignee: Dresser Industries, Inc., Dallas, Tex.

[21] Appl. No.: 947,382

[22] Filed: Oct. 2, 1978

[51] Int. Cl.³ .............................................. G01F 1/00
[52] U.S. Cl. ................... 364/510; 364/571; 235/92 FL; 73/861.03
[58] Field of Search ............. 364/510, 571; 73/231 M, 73/231 R, 194 R, 194 E, 194 M, 194 EM; 235/92 FL

[56] References Cited

U.S. PATENT DOCUMENTS

| | | | |
|---|---|---|---|
| 3,425,274 | 2/1969 | Clement et al. | 73/194 R |
| 3,537,312 | 11/1970 | Moore | 73/231 M |
| 3,588,481 | 6/1971 | Stroman | 73/195 |
| 3,605,497 | 9/1971 | Zimmerman et al. | 73/231 M |
| 3,610,898 | 10/1971 | Yamamoto et al. | 73/194 M |
| 3,614,892 | 10/1971 | Ottenstein | 364/510 |
| 3,635,084 | 1/1972 | Lamphere et al. | 73/194 M |
| 3,688,573 | 9/1972 | Garrett | 73/194 R |
| 3,699,320 | 10/1972 | Zimmerman et al. | 235/92 FL |
| 3,701,280 | 10/1972 | Stroman | 73/194 M |
| 3,729,995 | 5/1973 | Kovacs et al. | 364/510 |
| 3,802,261 | 4/1974 | Zimmerman et al. | 73/194 R |
| 3,822,377 | 7/1974 | Beck | 73/194 M |
| 3,823,310 | 7/1974 | Kalotay et al. | 235/92 FL |
| 3,831,011 | 8/1974 | Hulme | 235/92 FL |
| 3,839,911 | 10/1974 | Zimmerman et al. | 73/194 R |
| 3,854,038 | 12/1974 | McKinley | 235/92 FL |
| 3,862,405 | 1/1975 | Beck | 73/194 M |
| 3,895,529 | 7/1975 | Moore | 364/510 |
| 3,905,229 | 9/1975 | Togo et al. | 73/194 M |
| 3,979,953 | 9/1976 | Johns et al. | 73/231 M |
| 4,005,603 | 2/1977 | Golahny et al. | 73/194 M |
| 4,056,717 | 11/1977 | Cornforth | 364/510 |
| 4,093,871 | 6/1978 | Plumb et al. | 73/194 M |

Primary Examiner—Charles E. Atkinson
Assistant Examiner—Gary Chin
Attorney, Agent, or Firm—Daniel Rubin

[57] ABSTRACT

A self-contained correction unit operable in conjunction with a gas meter measuring an actual gas volume emits a digital output signal correlated to an equivalent standard gas volume therefor by correcting the actual gas volume for prevailing conditions of temperature and/or pressure. A temperature and/or pressure transducer is utilized which when exposed to the gas flow emits an analog voltage signal proportional to absolute values of the sensed parameter. By scaling the transducer output signal to a base condition voltage representing unity, a signal proportional to the desired correction is derived which is converted to a digital signal for supplying to a divider-counter. Within the divider-counter, a series of repetitive pulses corresponding to the actual volume measured by the meter is divided by the digital correction signal to yield a digital output signal of the corrected volume at the base condition for which correction was being sought.

22 Claims, 7 Drawing Figures

EQUIVALENT STANDARD VOLUME CORRECTION SYSTEMS FOR GAS METERS

TECHNICAL FIELD

The field of art to which the invention pertains comprises the art of measuring and testing.

BACKGROUND OF THE INVENTION

In the absence of provisions to the contrary, a volume measuring type gas meter will register the actual volume of gas being passed therethrough. However, where density changes of the gas are incurred in transmission from prevailing conditions of pressure and/or temperature, failure to correct for these changing parameters can result in substantial error and inaccuracy in the meter readout. In the instance of natural gas being supplied as fuel, it is, of course, recognized that the commodity of interest resides not in its volume but rather in its calorific content by unit of weight. Failure to correct therefore for prevailing conditions of temperature and/or pressure can result in significant economic advantages or disadvantages to both the vendor and/or purchaser of the gas line product. It is therefore usually desirable to correct the actual measured volume to the corresponding volume as if measured at a standard base condition of pressure and temperature.

A variety of devices for effecting such corrections have been developed over the years, many of which have only amounted to close approximations from failure to operate in close accordance with the gas laws. Mechanical-type equipment for correcting temperature and/or pressure parameters is disclosed, for example, in U.S. Pat. Nos. 2,059,547; 2,093,151; 2,122,529; 3,169,399 and 4,111,042. Electronic approaches to effecting such corrections are disclosed, for example, in U.S. Pat. Nos. 3,537,312; 3,588,481; 3,605,497; 3,831,011 and 3,862,405. Characterizing the mechanical correction units is the complexity of cams, gears, linkages, etc. and associated sluggishness of the mechanisms by which they operate. On the other hand, the electronic devices while representing significant simplification over the mechanical devices have nonetheless been characterized by an excessive number of procedural steps with their corresponding number of operating components for achieving the sought after corrections. While these limitations of the prior art have been recognized, it has not heretofore been known how to effect temperature and/or pressure correction with relatively greater simplification while continuing to operate in conformance with the gas laws.

SUMMARY OF THE INVENTION

The invention relates to a method and apparatus for correcting metered gas flow volume for prevailing conditions of temperature and/or pressure. More specifically, the invention relates to a self-contained electronic correction unit operable in conjunction with a gas meter measuring actual gas flow volume being passed therethrough to register a corrected volume corresponding to an equivalent base of standard temperature and/or pressure. The unit is characterized by a high order of accuracy yet without the complexity of similar purpose electronic units of the prior art.

This is achieved in accordance herewith by utilizing a sensor transducer exposed to the gas flow for measuring one or both of the prevailing parameters of pressure and/or temperature. The sensor transducer for each parameter is adapted to emit an analog voltage output signal linearly and proportionately responsive to absolute values of the measured parameter and scaled to emit a unity signal at the base condition. By converting the scaled output signal to a digital signal via an A/D converter, a correction factor is derived. The actual volume registered at the meter is converted by a pulse generator to a repetitive series of pulses and by means of a divider-counter is divided by the correction factor to yield a digital output signal correlated to the corrected volume for the standard base condition at which correction was sought. When the correction factor dividing the pulses also includes an arbitrary constant representative of the engineering units to be employed, a more useful output signal can be obtained. In this manner utilizing a minimum number of procedural steps, the mentioned handicap of the prior art mechanical correction devices are readily overcome, while compared to the prior art electronic devices, relatively greater simplicity is thereby afforded.

It is therefore an object of the invention to provide novel apparatus for correcting actual volume of gas flow to a corrected volume at an equivalent standard base of pressure and/or temperature.

It is a further object of the invention to effect the previous object by procedural steps affording enhanced simplicity as compared to similar purpose systems of the prior art.

Before discussing the drawings, it is essential to appreciation of the invention that the underlying principles hereof be clearly understood. Beginning with the ideal gas laws, the relationships for correcting actual gas volume to a base condition for temperature and/or pressure alone or in combination are defined by the following equations:

$$(1)\ V = q\frac{(T_b)}{(T_f)} \qquad (2)\ V = q\frac{(P_f)}{(P_b)}$$

$$(3)\ V = q\frac{(P_f)}{(P_b)}\frac{(T_b)}{(T_f)} \qquad (4)\ V = q\frac{(P_f)}{(P_b)}\frac{(T_b)}{(T_f)}(F_{pv})^{2*}$$

where:
V = Corrected Gas Volume
q = Uncorrected Gas Volume
$P_b$ = Standard Base Pressure, (absolute)
$P_f$ = Pressure of the Flowing Gas, (absolute)
$T_b$ = Standard Base Temperature, (absolute)

Figure 1:
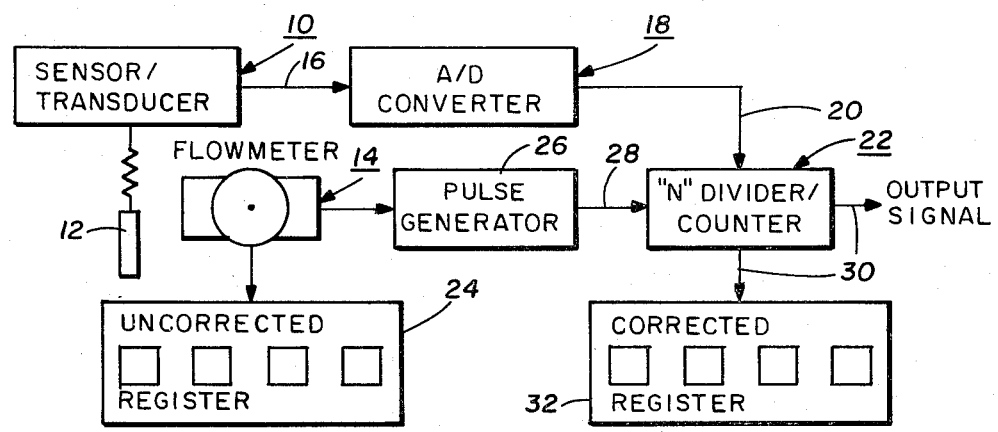
FIG. 1 is a flow chart in block diagram form for the system of the invention.

$T_f$ = Temperature of the Flowing Gas, (absolute)
$F_{pv}$ = Supercompressibility Factor from AGA By adopting a base value for either pressure or temperature of unity, e.g., 1.000 volt in accordance herewith, the above equations can be rewritten as follows:

(5) $V = \dfrac{q}{(T_f)}$  (6) $V = \dfrac{q}{(P_f)} - 1$ (7) $V = \dfrac{q}{\dfrac{(T_f)}{(P_f)}}$  (8) $V = \dfrac{q}{\left[\dfrac{T_f}{P_f(F_{pv})^2}\right]}$ Referring now to FIG. 1, a sensor transducer 10 has its sensing element 12 positioned in the gas stream of the gas flow through meter 14 which for purposes of description will be considered to be a positive displacement meter. Transducer 10 is operative so as to emit an analog voltage signal 16 scaled from a base value representing unity and directly proportional to the measured parameter of absolute pressure and/or temperature sensed by element 12. Analog signal 16 is then converted via A/D converter 18 to a digital output "N" signal 20 constituting a correcting factor to function as the divisor in any of the above equations 5 through 8 supplied to a divide-by-"N" counter 22. Simultaneously therewith, flow meter 14, which optionally operates an uncorrected register 24 for indicating actual volume of gas passing through the meter, also drives a pulse generator 26 to generate a repetitive series of pulses 28. The latter pulses are also supplied to the divide-by-"N" counter 22 to function as the dividend in the above equations 5 through 8. Within the divider-counter, pulses 28 are divided by the correcting factor to emit a digital output signal 30. The output signal can be utilized for operating a corrected register 32, supplied optionally to a totalizer, flowrate or telemetering terminal, etc. locally or remotely available for receipt of the signal.

Figure 2:
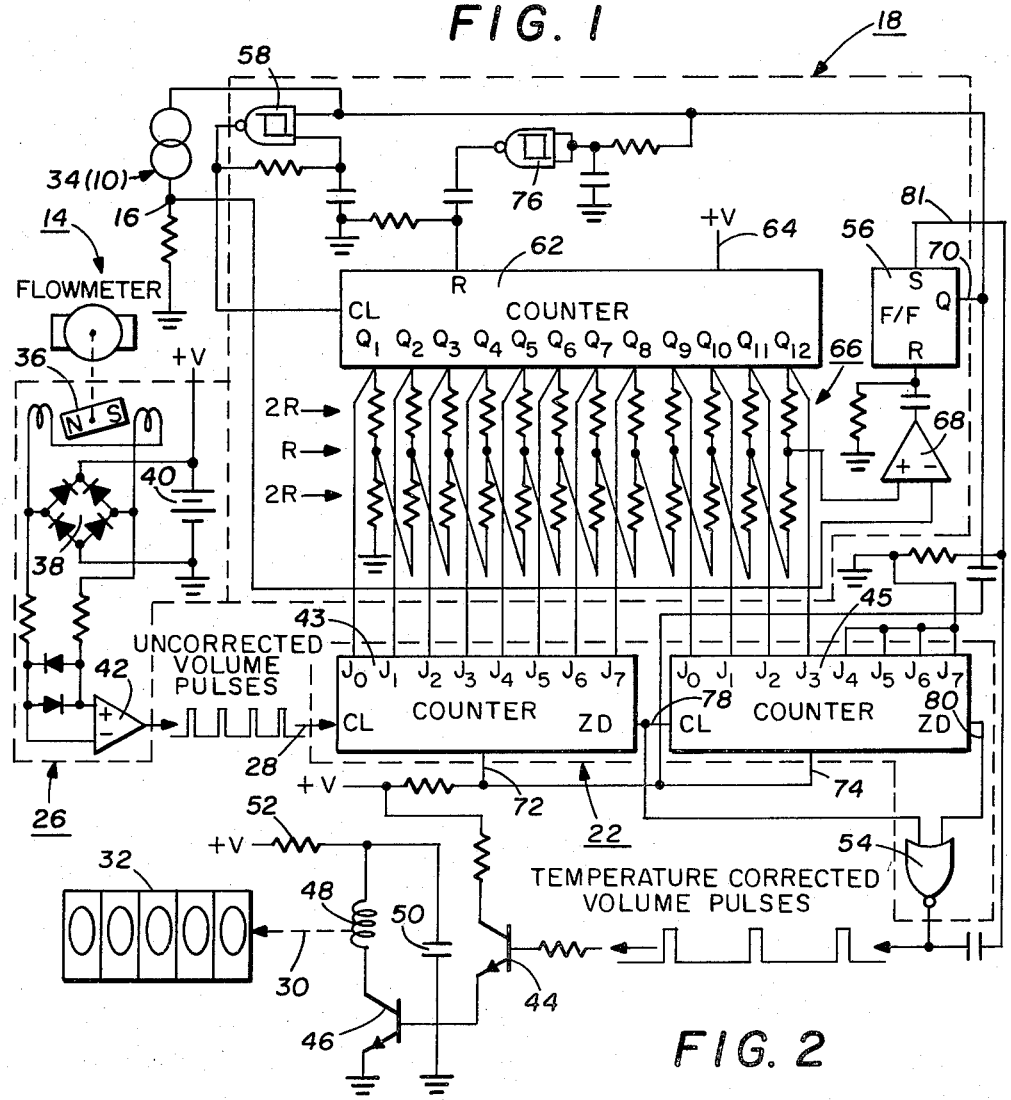
FIG. 2 is a schematic electrical circuit diagram for effecting temperature correction in accordance herewith.

Reference is now made to the schematic circuit diagram of FIG. 2 by which temperature correction in compliance with equation 5 is obtained in a preferred self-powered embodiment. Temperature sensor transducer 34 for purposes hereof is of a type commercially available as Model AD 590 manufactured by Analog Devices of Norwood, Mass. and comprises a series current regulator precalibrated to deliver one microampere per degree Kelvin according to its temperature exposure. Current is passed through a precision resistor to develop the desired voltage scale. In a preferred mode, 1.000 volt would be developed at a temperature exposure corresponding to a selected base temperature of, for example, 60° F. (288.7° K.)

Signal 16 from transducer 34 is supplied to A/D converter 18 which includes gated oscillator 58, inverter 76, counter 62, flip-flop 56 and comparator 68. Counter 62, as shown, includes 12 binary weighted output terminals $Q_1$ through $Q_{12}$. The R/2R resistor network connected to the binary output terminals of counter 62 in conjunction with the specific voltage applied to terminal 64, functions to effect analog-to-digital conversion in a well known manner. The binary output terminal of the R/2R resistor network 66 rises in the embodiment hereof one millivolt for each input cycle counted such that its output will appear as a stair-step positive voltage rising from zero at one millivolt per step (per count). This developed voltage is presented to the non-inverting (+) input of voltage comparator 68 to be equated with the voltage from temperature sensor 34, being presented to the inverting (−) input of comparator 68. So long as the inverting input of comparator 68 is more positive than the non-inverting input, output of comparator 68 will remain a logic low. The single (and final) millivolt step at the output of resistor network 66 which causes the non-inverting comparator input to become more positive than the inverting input will cause the comparator output to go high and reset flip-flop 56. As the flip-flop is reset, the Q terminal goes low and stops the gated oscillator 58. At this instant, the binary bit count at the $Q_{1-12}$ terminals represent the number of millivolts equal to the voltage developed by temperature sensor 34. The bit count number is connected directly to corresponding binary weighted J inputs on presettable counters 43 and 45 of divider-counter 22.

Positive displacement meter 14 is fitted with a rotating magnet 36 which generates an alternating current and voltage as described, for example, in U.S. Pat. No. 3,636,392. Developed AC voltage is rectified by diode bridge 38 to charge a nickel cadmium battery 40 which for the embodiment being described is able to supply energy for the entire electronic system on a self-contained basis. Alternating voltage reversals are sensed by differential amplifier 42 to produce sharply squared voltage pulses recurring at a rate directly proportional to the actual gas volume passing through the meter. The generator and its coupling to meter 14 may conveniently be designed to produce, for example, 100 pulses per cubic foot of metered gas. The volume pulses from generator 26 are introduced on line 28 to the input of divider-counter 22 which if programmed with a correcting signal bit count of 1000 develops one output pulse for each 10 cubic feet measured by the meter.

Divider-counter 22 includes integrated circuit counters 43 and 45 that are presettable down-counters which are preset with a programmed count that is decremented one count by each input clock pulse. When the remaining storage count has reached zero, the Zero Detect terminals 78 and 80 go low and the output of NOR 54 goes high to become the onset of the output pulse. This pulse rise is also coupled to the set input 81 of flip-flop 56 causing Q terminal 70 to go high. This logic applies positive potential to temperature sensor 34 while also turning on gated oscillator 58. The high frequency signal generated by the latter which, for example, could be 50 kilohertz, is introduced to the input terminal of counter 62. The latter counter has previously been reset to zero and begins to count upward, advancing one count for each cycle of the oscillator signal being received.

When flip-flop terminal 70 goes low it momentarily carries the Asynchronous Preset Enable terminals 72 and 74 low on the counters 43 and 45, respectively, resulting in immediate presetting of the counters through the J inputs. A short time delay coupling the low flip-flop signal to inverter 76 causes counter 62 to be reset to zero after its total bit count has been transferred to counters 43 and 45. At the instant when counters 43 and 45 are preset, their terminals 78 and 80 go high thereby terminating the duration of the output signal pulse as NOR 54 goes low. At that point, a full A/D conversion cycle has been completed, and the temperature correcting value has been introduced to divider-counter 22 as the divisor "N" to temperature correct flow meter pulse count. The latter is also introduced to divider-counter 22 as the dividend while being reduced to the corrected desired engineering units.

During the interval between output pulses from NOR 54, the base of transistor 44 is held low so that its collector-emitter path is cut-off to in turn maintain power transistor 46 cut-off and electromagnetic coil 48 deenergized. Concomitantly, supply voltage from battery 40 is charging capacitor 50 to full battery voltage through resistor 52 before arrival of the next succeeding output pulse. When the next succeeding output pulse arrives, transistor 44 conducts and drives transistor 46 into saturation to connect the lower end of coil 48 to circuit common. This then places coil 48 across the terminals of fully charged storage capacitor 50 which discharges sufficient energy to the coil to advance one count in the electromechanical counter register 32. The full cycle occurs in a few milliseconds well before the next succeeding volume pulse is generated by flow meter 14 at maximum capacity and pulse rate. In this manner, temperature correction is updated at the end of each engineering unit volume of flow through the meter.

Figure 3:
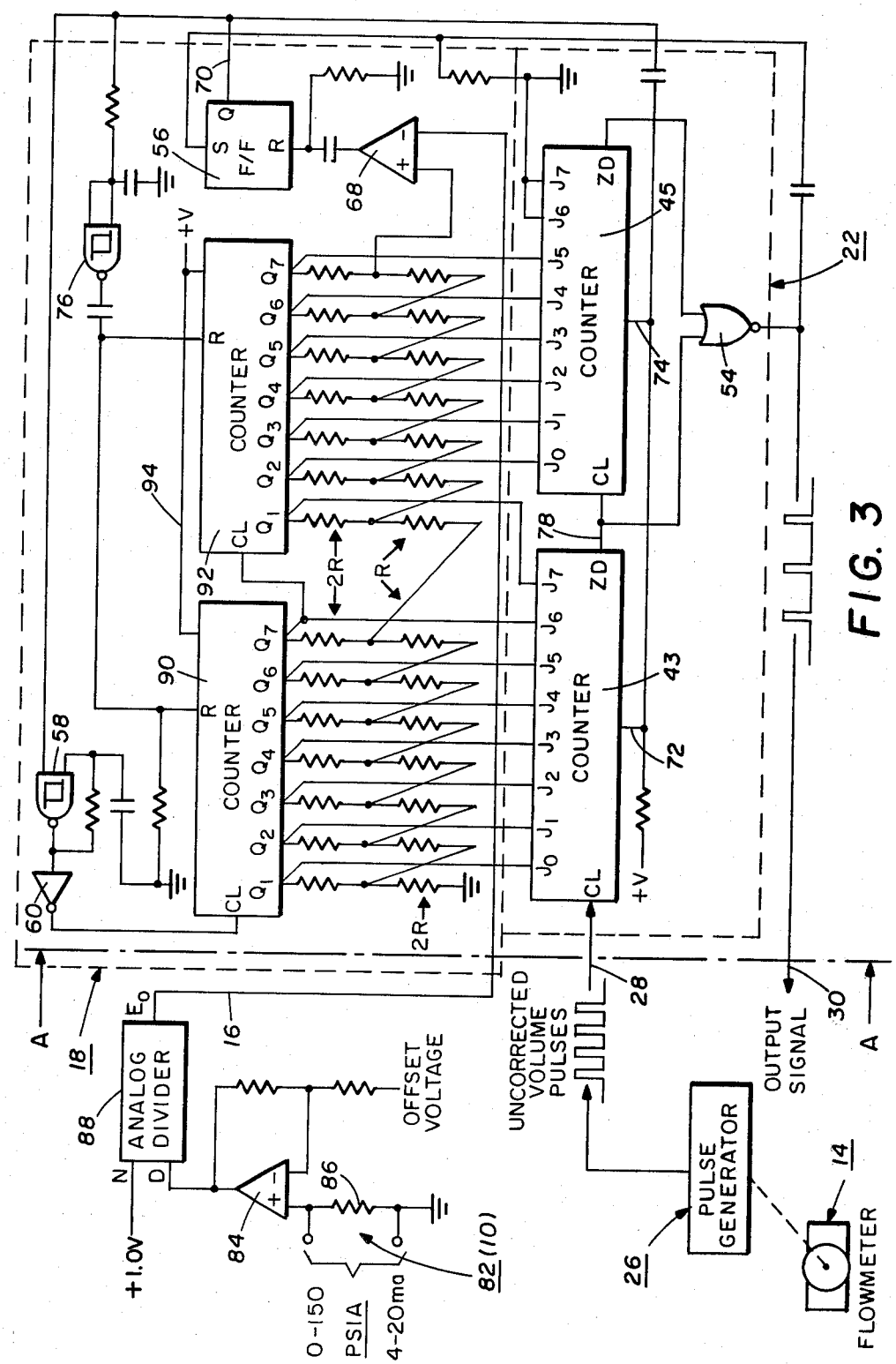
FIG. 3 is a schematic electrical circuit diagram for effecting pressure correction in accordance herewith.

Referring now to FIG. 3, pressure correction in satisfaction of equation 6 begins with a pressure transducer 82 sensing the flowing gas pressure and producing an analog voltage signal proportional to absolute pressure. A commercially available pressure transducer 82 is assumed with a typical electrical current output of 4–20 milliamperes over a sensitivity range of 0–150 p.s.i.a. Suitable units for the purposes hereof are available from a variety of sources such as the Foxboro Co. of Foxboro, Mass.

The current output of transducer 82 may be directed through resistor 86 to yield a voltage for operational amplifier 84 with suitable gain and offset adjustment. This will then yield a voltage at the D input of analog divider 88 that is proportional to absolute pressure and with a value of 1.000 volt for the selected base pressure. Analog-divider 88 is a commercially available integrated circuit element marketed as type 4291-K manufactured by Burr-Brown of Tucson, Ariz. The output signal on line 16 becomes an analog voltage numerically equal to the reciprocal of the pressure correction factor $P_f/P_b$ expressed in equation 2 above and is $(P_f)^{-1}$ as required in equation 6.

As before, the R/2R analog-to-digital conversion technique is utilized in A/D converter 18 to emit the millivolt bit count developed from the analog voltage as above. Unlike the previous embodiment, the number of Q outputs required from converter counters 90 and 92 is greater to enable the bit count to exceed 10,000 as opposed to lower maximum count required in the embodiment of FIG. 2. This difference also necessitates a correspondingly greater voltage source for the counters at the terminals connected to line 94. Moreover, because of the relatively large range of pressure correction factor, higher pressures could result in undesirably small voltages after division by analog divider 88 therefore rendering it convenient to multiply the result by 10 which is inherent in divider 88. This requires that at base pressure the analog voltage to be digitized be 10 volts and be converted into a bit count of 10,000 which achieves a division of "q" by 10,000 to reach desired engineering units. Furthermore, at the higher pressures to be encountered, developed bit count for "N" will be near 1,000 thereby ensuring that the smallest discrete element of change in the value "N" remains an incremental step of approximately 0.1% preserving a desirable worst-case resolution. With the foregoing exceptions the circuit hereof is functionally similar to the comparable portions of FIG. 2 in which certain of the components have been similarly designated.

Figure 4:
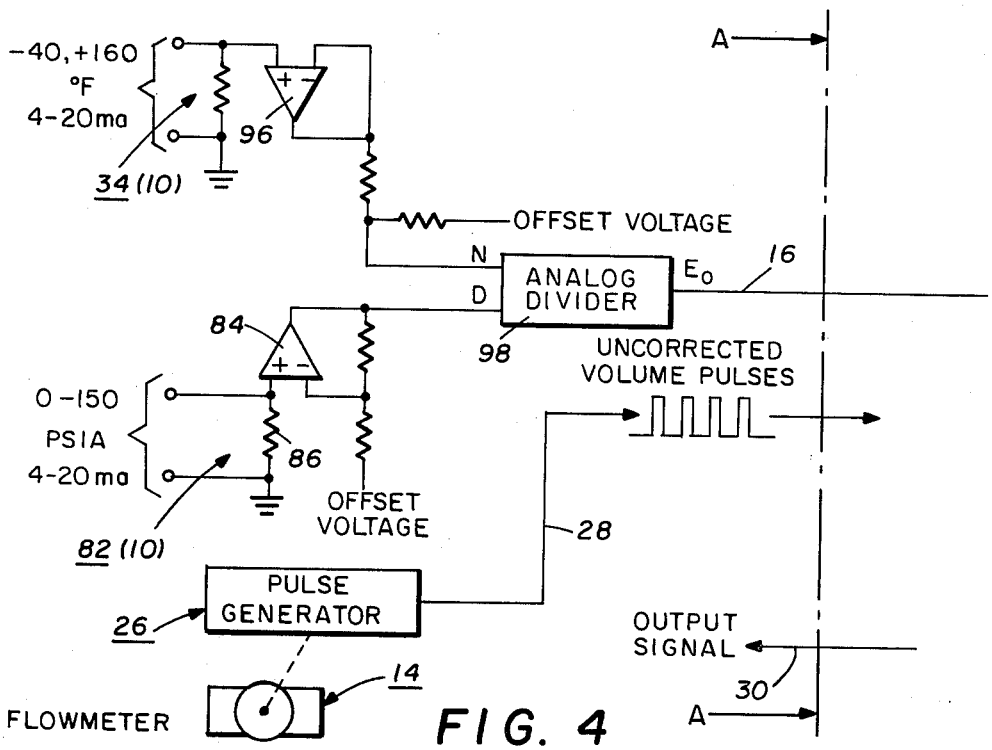
FIG. 4 is a partial modification of the circuit diagram of FIG. 3 for effecting both pressure and temperature correction.

Referring now to FIG. 4, combined pressure-temperature correction in satisfaction of equation 7 is illustrated insofar as it differs from FIG. 3, it being understood that the balance of the circuit unshown is common with that portion to the right of line A—A in FIG. 3. Flowing line pressure is sensed by pressure transducer 82 and as before its analog voltage output is directly proportional to absolute pressure and is introduced to scaling and normalizing amplifier 84 to yield a base pressure response of 1.000 volt at the D input terminal of analog divider 98. Flowing line temperature is sensed by transducer 34, the analog voltage of which is directly proportional to absolute temperature, and is introduced to scaling and normalizing amplifier 96 to yield a base temperature response of 1.000 volt at the N input terminal of analog divider 98. Within analog divider 98, the temperature parameter is divided by the pressure parameter to provide a ratio $T_f/P_f$. For the reasons previously indicated, this ratio is multiplied by 10 to preserve a large enough voltage for the desired resolution of accuracy in the millivolt bit count in A/D converter 18. It should also be apparent that if the flowing gas temperature in this ratio relation corresponds to the base temperature, $T_f$ would remain continuously at 1.000 volt. Consequently, operation of the circuit of FIG. 4 under those circumstances would function identically to that of FIG. 3 by being responsive only to variations of pressure as measured by pressure transducer 82.

Figure 5:
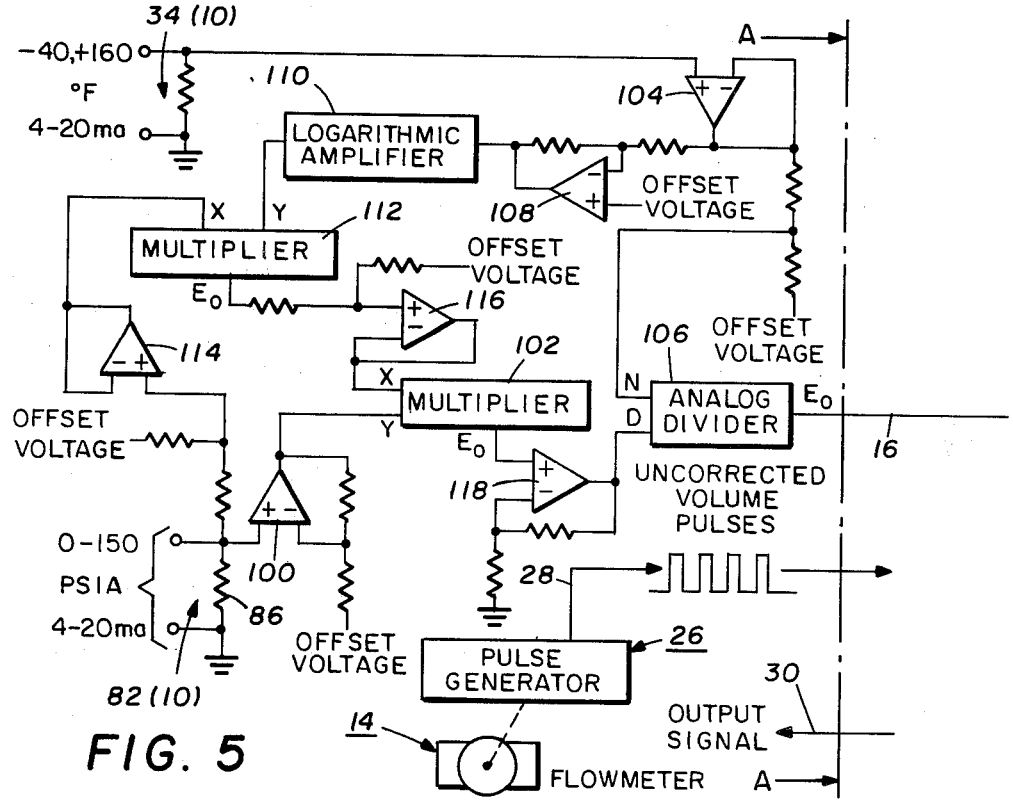
FIG. 5 is a partial modification of the circuit diagram of FIG. 3 for effecting correction of both pressure and temperature including a supercompressibility gas factor for natural gas.
Figure 6:
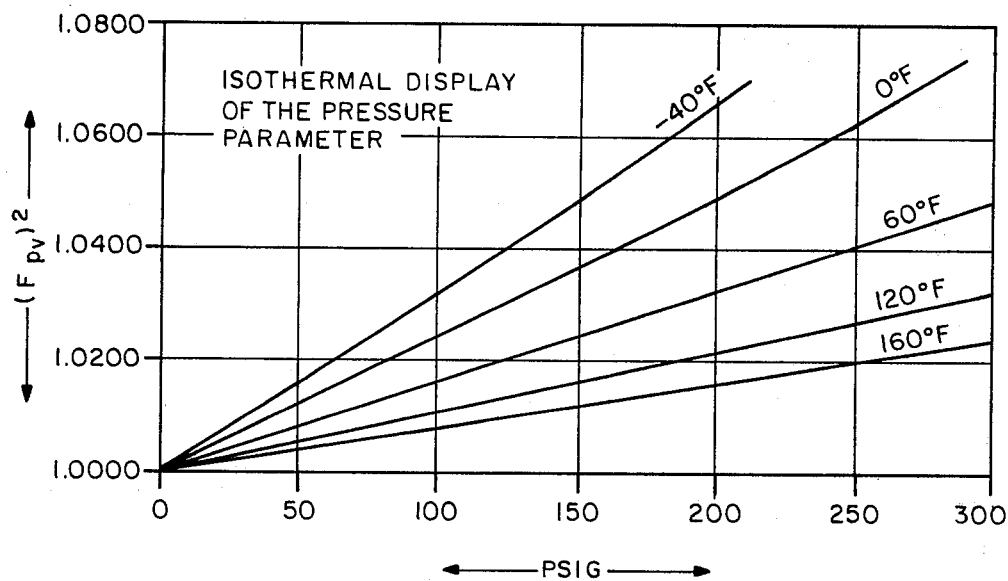
FIGS. 6 and 7 are graphical representations of the supercompressibility gas factors for natural gas at varying conditions of pressure and temperature, respectively.
Figure 7:
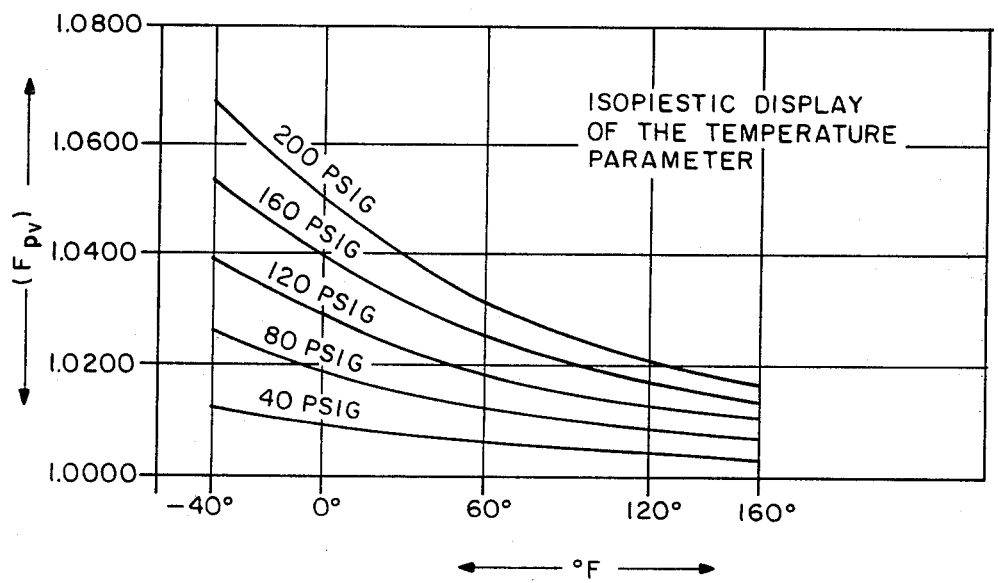

The circuit of FIG. 5 operates in satisfaction of equation 8 enabling correction for both temperature and pressure with introduction of a supercompressibility factor. The unshown portion of this circuit is likewise common to FIG. 3 to the right of line A—A. The supercompressibility factors shown in FIGS. 6 and 7 are for natural gas when utilized with a positive displacement type meter and were developed by the Gas Measurement Committee of the American Gas Association (AGA) for reflecting deviations of natural gas from the ideal gas laws. Inspection of the latter figures reveals that over the pressure range in FIG. 6 at 160° F. (the highest temperature likely to be encountered) the fractional portion of the factor varies linearly and has the smallest slope. At any lower temperature the response at various pressures is also linear but with increased slope. In FIG. 7 the temperature slope at any fixed pressure is non-linear and the curve is described mathematically by the expression $y=2^x$, where x is inversely related to the temperature value and y will be a multiplier to be applied to the linear pressure response developed as though the temperature was fixed at 160° F.

As described for the circuit of FIG. 4, the output voltage signal of pressure transducer 82 passed through resistor 86 is scaled and normalized via amplifier 100 connecting its output to the Y input of analog multiplier 102. Likewise, temperature transducer 34 emits its analog signal via buffer amplifier 104 to develop a voltage analog of the flowing temperature $T_f$ that is scaled and normalized to the N input of analog divider 106. For introducing the supercompressibility factor, the temperature output signal from amplifier 104 is inverted, scaled and multiplied by the logarithm of 2 through operational amplifier 108. The output of amplifier 108 is in turn supplied to analog amplifier 110 to produce a resulting antilog voltage which is the analog of y following the function $y=2^x$ where x is the inverse of the value of $T_f$. The voltage y is introduced at the y input to multiplier 112. At the same time, operational amplifier 114 scales and normalizes the pressure signal voltage into the linear slope function required as the pressure changes over the range of interest and with the slope value required by the highest anticipated temperature condition (160° F.)

The output signal of amplifier 114 is supplied to the X input terminal of multiplier 112 which emits a resultant product signal to amplifier 116 properly scaled so that the output of 116 becomes the analog voltage value numerically equal to $(F_{pv})^2$. This is then utilized as a multiplier for the direct pressure signal $P_f$ while multiplier 102 derives the product of $P_f \times (F_{pv})^2$ to produce a resulting signal introduced as one tenth the product xy to amplifier 118 in which the desired value is recovered through a gain of ten. This in turn is supplied as the denominator of analog divider 106. The output from divider 106 is numerically equal to the divisor of equation 8 for dividing the uncorrected volume pulses "q" to achieve fully corrected pulses in the desired engineering units. In this arrangement, only the amplifiers 108, 114 and 116 in conjunction with analog units 102, 110 and 112 are required to properly account for the supercompressibility factor over the limited but fully adequate range of pressures and temperatures normally encountered in the metering of natural gas distribution systems. Each of the analog dividers 88, 98 and 106, the analog multipliers 102 and 112 and logarithmic amplifier 110 are high accuracy units available commercially from Burr-Brown of Tucson, Arizona.

For determining calibration values, the output of pulse generator 26 at meter 14 is determined first. The number of pulses per actual unit of volume can range from somewhat below 1000 at the lower end to well above 10,000 at the upper end for reduction to the unit of volume per pulse desired in the corrected output signal. Counter division required to reduce the meter output pulses to final engineering units when no correction is required, i.e. at base conditions, is then determined. This counter division is the "N" required from A to D converter 18 when condition parameters are at base value. Number "N" is an integer of three, four or more succeeding most significant decimal digits proportionally derived from the analog voltage representing the reciprocal of the correction factor required by the flowing fluid condition parameter(s). The voltage value per bit in the number "N" dictates the analog voltage presented to the A to D converter for conditions of no correction. With the analog voltage determined for base conditions of no correction, the normalizing of the scaled voltages from the condition parameter sensors may be set to comply with the value(s) dictated.

By the above description there is disclosed novel system and apparatus for effecting temperature and/or pressure correction of an actual volume of gas to a corresponding volume at any selected base condition. The system is comparatively simple to execute while retaining the high order of accuracy required for such systems. For achieving these results, it is only important to the system hereof that it operate in accordance with the fundamental relationships of:

(1) the divide-by-"N" count division for no correction to the meter output pulses be determined with acceptable incremental resolutions;

(2) the final analog presented to the input of the A/D converter when pressure and/or temperature sensors are at base conditions must yield a digital bit count at the converter output equal to the number "N" chosen in the previous step; and (3) the voltage output from the pressure and/or temperature transducers must be scaled and normalized to implement the equation functions and produce the correct final analog voltage for the base conditions. The scaled and normalized transducer outputs must also be directly proportional to absolute temperature and/or pressure.

It is to be understood in connection with the above description that the use of exact voltages such as 1.000 volt, 10.000 volts, as well as exactly even divide-by-"N"=1000 or 10,000 greatly simplifies description and understanding of the operational sequence. It should, of course, be recognized that these values are not critical in number values but rather only insofar as the relationship between the number values is important to the system hereof. That is, by setting the base condition voltage to 1.000 volt it can be more easily understood how the parameter voltage becomes directly the correction factor or the reciprocal of the correction factor according to the appearance of 1.000 below or above the fraction line, respectively. However, by setting the base condition voltage at some chosen value other than 1.000 with the recognition that its value is equivalent to the numeral one (unity), then its parameter voltage values similarly vary directly as the correction factor or the reciprocal of the correction factor as above. Consequently, the correction system hereof is extremely flexible in that (a) meter, pulses per actual unit volume may be any number; (b) corrected output signal pulses may represent any desired engineering unit; (c) any desired value of voltage may be established for individual bit increments in the A to D converter; and (d) absolute base pressure and temperature may be set to any desired voltage value.

In summary of the foregoing, the divide-by-"N" number accepted as the value for dividing the uncorrected meter pulses while causing no pressure or temperature corrections can be any number sufficiently large to have satisfactory incremental resolution. Likewise, pulses generated at the meter do not have to be round numbers per unit of volume and the output of the divide-by-"N" counter does not have to be in exact engineering units. Moreover, additional count scaling can be performed at the meter ahead of the controlled counter or after the controlled counter.

Since many changes could be made in the above construction and many apparently widely different embodiments of this invention could be made without departing from the scope thereof, it is intended that all matter contained in the drawings and specifications shall be interpreted as illustrative and not in a limiting sense.

The embodiments of the invention in which an exclusive property or privilege is claimed are defined as follows:

1. A correction apparatus for correcting actual flow volume of fluid flow at prevailing conditions of pressure and temperature to a corresponding value at a standard base condition for at least one parameter of said prevailing conditions, comprising in combination:

(a) pulse generating means for generating pulses representing uncorrected volume in a ratio proportional to the actual volume of fluid flow at prevailing conditions; said ratio of pulse generation being proportionately greater by at least one order of magnitude relative to a predetermined pulse to volume ratio for a selected engineering unit with which it is to be compared;

(b) sensor transducer means sensitive to the condition parameter for which correction is to be effected and adapted for exposure to the fluid flow at said prevailing conditions, said sensor transducer means being operative to emit an output signal proportional to the absolute value of its measured parameter;

(c) scaling means operative for emitting an output signal corresponding to the product of said sensor transducer means output signal and a constant correlated to a ratio comparison between the pulse to volume ratio generated by said pulse generating means and the pulse to volume ratio of the selected engineering unit; and (d) divider-counter means operative to divide all of said uncorrected volume pulses by said scaling means output signal and to emit a digital output signal correlated to a volume of fluid flow corrected for the parameter sensitivity of said sensor transducer means.

2. A correction apparatus according to claim 1 in which said sensor transducer means is sensitive to changes of temperature in the prevailing conditions of fluid flow.

3. A correction apparatus according to claim 1 in which said sensor transducer means is sensitive to changes of pressure in the prevailing conditions of fluid flow.

4. A correction apparatus according to claims 1, 2, or 3 in which the signal emitted by said sensor transducer means is an analog signal and there is included an analog-to-digital converter means for converting the scaling means output signal to a corresponding digital signal thereof.

5. A correction apparatus for correcting actual flow volume of fluid flow at prevailing conditions of pressure and temperature to a corresponding value at a standard base condition, comprising in combination:

(a) pulse generating means for generating pulses representing uncorrected volume in a ratio proportional to the actual volume of fluid flow at prevailing conditions; said ratio of pulse generation being proportionately greater by at least one order of magnitude relative to a predetermined pulse to volume ratio for a selected engineering unit with which it is to be compared;

(b) sensor transducer means comprising two sensor transducers, one of which is sensitive to temperature and the other of which is sensitive to pressure with each of said sensor transducers being adapted for exposure to fluid flow at said prevailing conditions and operative to emit an output signal proportional to the absolute value of its measured parameter;

(c) divider means receiving the output signals from each of said sensor transducers and operative to emit an output signal corresponding to a quotient of the received signals;

(d) scaling means operative for emitting an output signal corresponding to the product of said divider means output signal and a constant correlated to a ratio comparison between the pulse to volume ratio generated by said pulse generating means and the pulse to volume ratio of the selected engineering unit; and (e) divider-counter means operative to divide all of said uncorrected volume pulses by said scaling means output signal and to emit a digital output signal correlated to a volume of fluid flow corrected for both temperature and pressure.

6. A correction apparatus according to claim 5 in which the fluid flow comprises a gas flow and there is included supercompressibility factor means effective to vary the emitted output signal of said divider means in correlation with the supercompressibility characteristics of the flowing gas.

7. A correction apparatus according to claim 6 or 5 in which the signal emitted by said divider means is an analog signal and there is included an analog-to-digital converter means for converting the scaling means output signal to a corresponding digital signal thereof.

8. A correction system for correcting actual flow volume of fluid flow at prevailing conditions of pressure and temperature to a corresponding value at a standard base condition for at least one parameter of said prevailing conditions, comprising in combination:

(a) a flow meter adapted to pass the fluid flow;

(b) pulse generating means actuated by said flow meter for generating pulses representing uncorrected volume being passed by said meter in a ratio proportional to the actual volume of fluid flow at prevailing conditions; said ratio of pulse generation being proportionately greater by at least one order of magnitude relative to a predetermined pulse to volume ratio for a selected engineering unit with which it is to be compared;

(c) sensor transducer means sensitive to the condition parameter for which correction is to be effected and adapted for exposure to the fluid flow at said prevailing conditions, said sensor transducer means being operative to emit an output signal proportional to the absolute value of its measured parameter;

(d) scaling means operative for emitting an output signal corresponding to the product of said sensor transducer means output signal and a constant correlated to a ratio comparison between the pulse to volume ratio generated by said pulse generating means and the pulse to volume ratio of the selected engineering unit; and (e) divider-counter means operative to divide all of said uncorrected volume pulses by said scaling means output signal and to emit a digital output signal correlated to a volume of fluid flow corrected for the parameter sensitivity of said sensor transducer means.

9. A correction system according to claim 8 in which said flow meter is operative by the fluid flow for effecting a measurement of the actual flow volume being passed therethrough.

10. A correction system according to claim 9 in which the output signal of said sensor transducer means is analog and there is included analog-to-digital converter means for converting the scaling means output signal to a corresponding digital signal thereof.

11. A correction system according to claim 8 including utilization apparatus adapted to receive the output signal of said divider-counter means.

12. A correction system according to claim 8 in which said sensor transducer means is sensitive to changes of temperature and there is included A.C. generating means operative by said meter and battery means maintained charged by said generating means for supplying electrical power to the electrically operative elements of the system.

13. A correction system for correcting actual flow volume of fluid flow at prevailing conditions of pressure and temperature to a corresponding value at a standard base condition comprising in combination:

(a) a flow meter adapted to pass the fluid flow;

(b) pulse generating means actuated by said flow meter for generating pulses representing uncorrected volume being passed by said meter in a ratio proportional to the actual volume of fluid flow at prevailing conditions; and ratio of pulse generation being proportionately greater by at least one order of magnitude relative to a predetermined pulse to volume ratio for a selected engineering unit with which it is to be compared;

(c) sensor transducer means comprising two sensor transducers, one of which is sensitive to temperature and the other of which is sensitive to pressure with each of said sensor transducers being adapted for exposure to fluid flow at said prevailing conditions and operative to emit an output signal proportional to the absolute value of its measured parameter;

(d) divider means receiving the output signals from each of said sensor transducers and operative to emit an output signal corresponding to a quotient of the received signals;

(e) scaling means operative for emitting an output signal corresponding to the product of said divider means output signal and a constant correlated to a ratio comparison between the pulse to volume ratio generated by said pulse generating means and the pulse to volume ratio of the selected engineering unit; and (f) divider-counter means operative to divide all of said uncorrected volume pulses by said scaling means output signal and to emit a digital output signal correlated to a volume of fluid flow corrected for both temperature and pressure.

14. A correction system according to claim 13 in which the fluid flow comprises a gas flow, and there is included supercompressibility factor means effective to vary the emitted output signal of said divider means in correlation with the supercompressibility characteristics of the flowing gas.

15. A correction system according to claims 10 or 13 in which said meter comprises a positive displacement type for the metering of natural gas.

16. A correction system according to claim 15 in which said meter includes a corrected register operative by the output signal of said divider-counter means for indicating the quantity of passed flow at the selected base condition.

17. A correction method for correcting actual flow volume of fluid flow at prevailing conditions of pressure and temperature to a corresponding value at a standard base condition for at least one parameter of said prevailing conditions, the combination comprising the steps of:

(a) generating pulses representing uncorrected volume in a ratio proportional to the actual volume of fluid flow at prevailing conditions; said ratio of pulse generation being proportionately greater by at least one order of magnitude relative to a predetermined pulse to volume ratio for a selected engineering unit with which it is to be compared;

(b) sensing the condition parameter for which correction is to be effected at said prevailing conditions and emitting an output signal proportional to the absolute value of the measured parameter;

(c) emitting a scaled output signal corresponding to the product of said sensed condition output signal and a constant correlated to a ratio comparison between said generated pulse to volume ratio of fluid flow and the pulse to volume ratio of the selected engineering unit; and (d) dividing all of said uncorrected volume pulses by said scaled output signal to emit a digital output signal correlated to a volume of fluid flow corrected for said sensed parameter.

18. A correction method according to claim 17 in which said sensing step senses changes of temperature in the prevailing conditions of fluid flow.

19. A correction method according to claim 17 in which said sensing step senses changes of pressure in the prevailing conditions of fluid flow.

20. A correction method for correcting actual flow volume of fluid flow at prevailing conditions of pressure and temperature to a corresponding value at a standard base condition, the combination comprising the steps of:

(a) generating pulses representing uncorrected volume in a ratio proportional to the actual volume of fluid flow at prevailing conditions; said ratio of pulse generation being proportionately greater by at least one order of magnitude relative to a predetermined pulse to volume ratio for a selected engineering unit with which it is to be compared;

(b) sensing the condition parameters for each of temperature and pressure measured at said prevailing conditions and emitting separate output signals proportional to each of their absolute values, respectively;

(c) dividing the emitted output signals for the measured condition parameters of temperature and pressure one by the other and emitting an output signal corresponding to the quotient thereof;

(d) emitting a scaled output signal corresponding to the product of said quotient output signal and a constant correlated to a ratio comparison between said generated pulse to volume ratio of fluid flow and the pulse to volume ratio of the selected engineering unit; and (e) dividing all of said uncorrected volume pulses by said scaled output signal to emit a digital output signal correlated to a volume of fluid flow corrected for both temperature and pressure.

21. A correction method according to claim 20 for a fluid flow comprising a gas flow, and there is included the step of varying the scaled output signal in correlation with the supercompressibility characteristics of the flowing gas.

22. A correction method according to claims 17, 18, 19, or 21 in which the signal emitted in response to the value of the measured parameter is an analog signal, and there is included the step of converting the scaled output signal thereof to a corresponding digital signal.

* * * * *